Sept. 1, 1964     J. E. HASLAM     3,147,176

MAGNETIC CAR DOOR PROTECTOR

Filed May 14, 1962     2 Sheets-Sheet 1

INVENTOR

James E. Haslam.

Sept. 1, 1964   J. E. HASLAM   3,147,176
MAGNETIC CAR DOOR PROTECTOR
Filed May 14, 1962   2 Sheets-Sheet 2
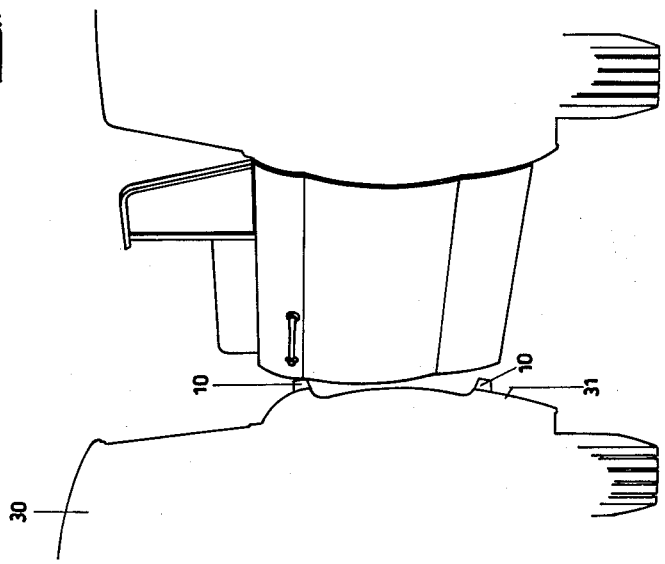
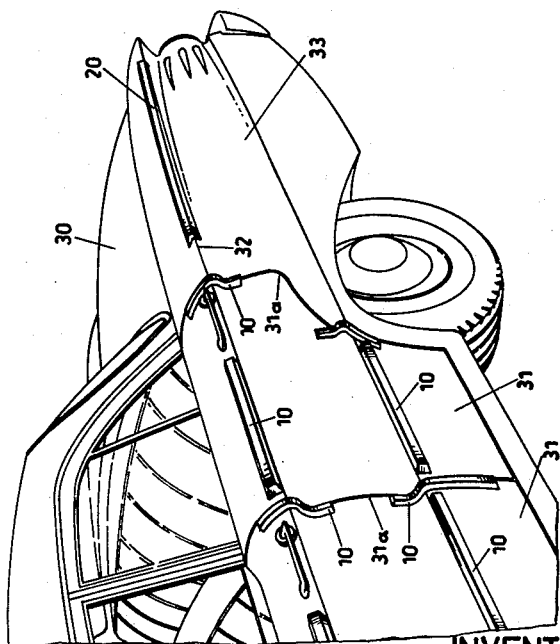
INVENTOR
James E. Haslam 3,147,176
MAGNETIC CAR DOOR PROTECTOR
James E. Haslam, 370 Eglinton Ave. E.,
Toronto 12, Ontario, Canada
Filed May 14, 1962, Ser. No. 194,333
4 Claims. (Cl. 161—39)

This invention relates to improvements in automobile accessories and more particularly to improvements in accessories adapted to protect the exterior surface finish of automobiles and the like.

It is well known that the general appearance of a car is considered one of its greatest assets and to this end most modern vehicles have somewhat complicated outer panels comprising mouldings and various undulatary shapes. Such panels are easily dented and scratched and the former especially are expensive to repair and often the scratching of the paint even can only be repaired by an extensive respray.

Most of this minor damage is done in parking lots and often when a car door is opened and caused to bang against the side of a vehicle adjacent to it, resulting in damage to both vehicles and often scrapes and bumps are made when moving in and out of parking spaces. To overcome this in the prior art door buffers and the like have been developed but such buffers are permanent fixtures and detract from the appearance of a car. The fitting of such buffers also requires that holes or the like be made through the door panels and the metal holding screws contained inside the panel. This latter is a lengthy and expensive process and also provides additional holes for the ingress of moisture to encourage rapid deterioration of the metal forming the panels.

It is, therefore, a principal object of the present invention to provide a magnetic protector for automobiles, to be hereinafter known as a protector strip, which may be applied to any part of the vehicle likely to be damaged by scraping or bumping.

It is another object of the present invention to provide a protector strip which will fit the contours of any door panel or the like.

It is a further object of the invention to provide a protector strip which may be fitted or removed at will without damaging a car's exterior but which is sufficiently strongly attached to the car to permit normal operation thereof without the strip becoming inadvertently removed.

These and other objects and features of this invention will become apparent when taken in conjunction with the accompanying drawings in which:

FIG. 4 is a sectional end elevation of a modified protector strip embodying the present invention adapted to be fitted along sharp edges and the like.

FIG. 6 is a fractional perspective view of an automobile to which a plurality of strips embodied in the present invention have been attached.

FIG. 7 is a front elevation of a car door opening onto a neighboring vehicle having the invention embodied thereon to show the protective action of the invention.

Figure 1:
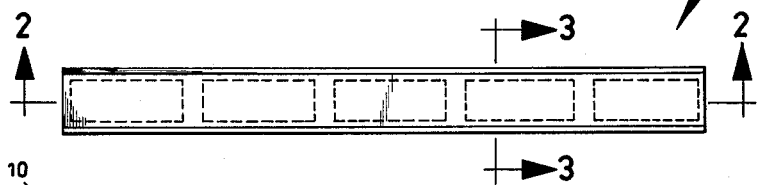
FIG. 1 is a plane view of a protector strip embodying the prevent invention.
Figure 2:
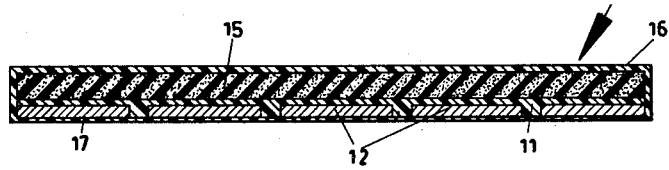
FIG. 2 is a sectional side elevation of the strip as illustrated in FIG. 1, taken on the line 2—2.
Figure 3:
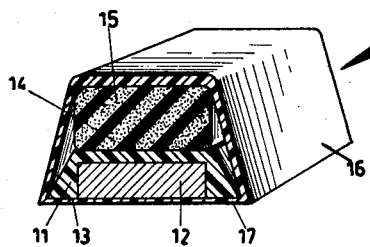
FIG. 3 is a sectional end elevation of the protector strip illustrated in FIG. 1, taken on the line 3—3.

Referring to FIG. 1, 2 and 3, a protector strip 10 comprises a length of soft, resilient material such as rubber or plastic 11 into which is inserted, preferably by moulding, a plurality of small, flat, powerful magnets 12. Magnets 12 are arranged in spaced apart relationship and are adapted to lie in longitudinal alignment adjacent with and parallel to the inner surface 13 of material 11.

The outer surface 14 of material 11 supports a very soft resilient material 15, such as for instance sponge rubber or sponge-like plastic. Material 15 is substantially coextensive with material 11 and the whole unit as described is encased in a sheath 16 of soft, hard wearing pliable material such as plastic, which does not interefere with the magnetic field of magnets 12.

Figure 4:
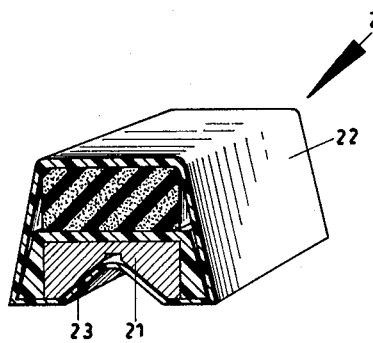

FIG. 4 illustrates a protector strip 20 similar in all respects to magnetic strip 10 as described with the exception of magnets 12 of strip 10 which are replaced by magnets 21 of substantially V-section adapted to permit the outer sheath 22 to have a channeled inner surface 23 to facilitate its installation on sharp mouldings and the like.

Figure 5:
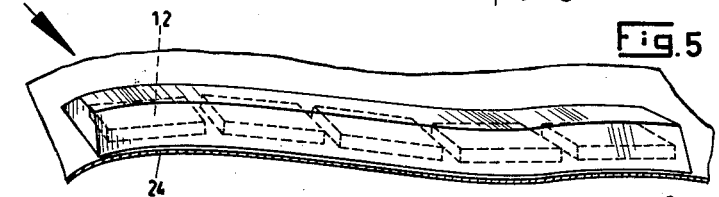
FIG. 5 is a perspective view of a protector strip embodying the present invention shown installed on a panel having a substantial wave form in it.

FIG. 5 illustrates how protector strip 10 is able to assume the shape of a contoured panel 24, the latter, of course, being of steel or the like so that magnets 12 remain attracted thereto, said magnets 12 being sufficiently small so that the inner surface 17 of sheath 16 is able to be held in close contiguity with panels having all but the most exaggereated curves to be found on a car.

Referring to FIGS. 6 and 7, protector strips 10 and 20 are illustrated located on a car 30, strips 10 being utilized along the relatively flat outermost portions of the doors 31 of car 30 while strip 20 is shown attached to the substantially sharp longitudinal edge 32 of the rear fender 33. It will also be seen that shorter strips 10 are located substantially vertically and are adapted to be attached to doors 31 adjacent the outermost free edges 31a thereof. In this manner, an adjacent car having its door open sufficiently wide to contact door 30, the door will contact horizontal strips 10 and damage to car 30 thereby averted. Similarly, upon a door 31 of car 30 being opened, the vertical strips 10 adjacent the rear edges 31a will absorb any shock or abrasion which may result if such an edge should hit an adjacent car. This action is illustrated more fully in FIG. 7.

It should be noted that, being magnetically attached, strips 10 and 20 are quickly and easily installed and may be removed when not required for use and stored in a convenient place, such as the glove compartment.

The general design of the individual parts of the invention as explained above may be varied according to requirements in regards to manufacture and production thereof, while still remaining within the spirit and principle of the invention, without prejudicing the novelty thereof.

The embodiments of this invention in which an exclusive property or privilege is claimed are defined as follows:

1. A magnetic protector for automobiles including a soft, flexible strip; magnet means attached to said strip on an inner surface thereof; resilient material attached to said strip on an outer surface thereof; and protective means on the exposed surface of said magnet means.

2. A magnetic protector for automobiles including a soft, flexible strip; a plurality of magnets embedded in said strip; resilient material attached to said strip; and flexible sheath means enclosing said strip; said magnets and said resilient material.

3. A magnetic protector for automobiles including a soft, flexible strip; a plurality of flat magnets embedded in said strip in spaced apart alignment; an elongated block of soft, foamed material attached to an outer surface of said strip; and a soft, flexible sheath closely enveloping said strip, said magnets and said foamed material.

4. A magnetic protector for automobiles including a soft, flexible strip; a plurality of V-section magnets embedded in said strip in spaced apart alignment, the opening of said V's facing outwardly of said strip; an elongated block of soft, foamed material attached to an outer surface of said strip; and a soft, flexible sheath closely enveloping said strip, said magnets and said foamed material, said sheath substantially following the contours of said magnets to produce a channeled inner surface in said protector.

References Cited in the file of this patent
UNITED STATES PATENTS

| | | |
|---|---|---|
| 2,803,493 | Haefliger | Aug. 20, 1957 |
| 3,111,728 | Alderfer | Nov. 26, 1963 |

FOREIGN PATENTS

| | | |
|---|---|---|
| 835,492 | Great Britain | May 18, 1960 |